(12) United States Patent
Koli et al.

(10) Patent No.: US 9,434,026 B2
(45) Date of Patent: Sep. 6, 2016

(54) SUBTERRANEAN SCREEN ASSEMBLY MANUFACTURING METHOD

(71) Applicant: BAKER HUGHES INCORPORATED, Houston, TX (US)

(72) Inventors: Jai K. Koli, Houston, TX (US); Don N. Simoneaux, Washington, LA (US)

(73) Assignee: Baker Hughes Incorporated, Houston, TX (US)

( * ) Notice: Subject to any disclaimer, the term of this patent is extended or adjusted under 35 U.S.C. 154(b) by 90 days.

(21) Appl. No.: 14/505,224

(22) Filed: Oct. 2, 2014

(65) Prior Publication Data

US 2016/0096240 A1    Apr. 7, 2016

(51) Int. Cl.
| | |
|---|---|
| *B23K 31/02* | (2006.01) |
| *B23K 20/02* | (2006.01) |
| *E21B 43/08* | (2006.01) |
| *B01D 29/11* | (2006.01) |
| *B01D 35/02* | (2006.01) |

(52) U.S. Cl.
CPC ........... *B23K 31/027* (2013.01); *B01D 29/111* (2013.01); *B23K 20/02* (2013.01); *B23K 20/023* (2013.01); *B23K 31/02* (2013.01); *E21B 43/086* (2013.01); *E21B 43/088* (2013.01); *B01D 35/023* (2013.01); *B23K 2201/06* (2013.01)

(58) Field of Classification Search
None
See application file for complete search history.

(56) References Cited

U.S. PATENT DOCUMENTS

| | | | | |
|---|---|---|---|---|
| 1,342,986 A | * | 6/1920 | Cater ...................... | E03B 3/20 166/230 |
| 2,217,370 A | * | 10/1940 | Johnston ............... | E21B 43/084 166/230 |
| 4,101,423 A | * | 7/1978 | Merrill ................... | B01D 29/111 210/494.1 |
| 4,141,481 A | * | 2/1979 | Van Petten ........... | B21C 37/157 228/145 |
| 4,664,307 A | * | 5/1987 | Curry ...................... | B61D 5/00 105/358 |
| 4,746,049 A | * | 5/1988 | Oe ......................... | B21C 37/123 228/17.7 |
| 4,902,417 A | * | 2/1990 | Lien ....................... | B01D 63/10 210/321.74 |
| 5,039,413 A | * | 8/1991 | Harwood ............. | B01D 24/001 210/457 |
| 5,114,582 A | | 5/1992 | Sandstrom et al. | |
| 5,230,726 A | | 7/1993 | Smith et al. | |
| 5,310,000 A | * | 5/1994 | Arterbury ............... | E21B 29/02 166/157 |

(Continued)

FOREIGN PATENT DOCUMENTS

| | | | |
|---|---|---|---|
| DE | 29620190 U1 | * | 2/1997 |
| JP | 05263415 A | * | 10/1993 |

(Continued)

*Primary Examiner* — Kiley Stoner
(74) *Attorney, Agent, or Firm* — Steve Rosenblatt

(57) ABSTRACT

A filtering assembly is laid flat on an outer shroud. An inner drainage layer is set over the filtering assembly while laid flat such that the inner drainage layer overlaps the filtering assembly. The inner drainage layer is sealed and secured to the outer shroud by diffusion bonding or welding while overlaying the filtering assembly. With the filtering assembly held firm between the inner drainage layer and the outer shroud a spiral winding procedure is commenced to roll the flat assembly into a cylindrical shape. The edges are sealed by welding or diffusion bonding. The spiral winding and seam closure can be done on a perforated base pipe or the base pipe can be inserted into the finished assembly at a later time and secured. Alternatively the filtering assembly and outer shroud, with or without the drainage layer can be wound over a perforated base pipe or a complete screen assembly.

18 Claims, 2 Drawing Sheets

(56) References Cited

U.S. PATENT DOCUMENTS

| | | | | |
|---|---|---|---|---|
| 5,460,721 A * | 10/1995 | Goodwin | B01D 29/111 156/190 |
| 5,642,781 A * | 7/1997 | Richard | B01D 46/2411 166/231 |
| 5,664,628 A * | 9/1997 | Koehler | B01D 29/111 166/228 |
| 5,711,879 A * | 1/1998 | Carlson | B01D 29/111 210/497.01 |
| 5,743,560 A * | 4/1998 | Jackson | B01D 39/086 280/741 |
| 5,881,809 A * | 3/1999 | Gillespie | B01D 29/15 166/233 |
| 5,881,812 A * | 3/1999 | Malbrel | B01D 29/111 166/278 |
| 5,901,789 A * | 5/1999 | Donnelly | E21B 43/04 166/207 |
| 5,957,366 A * | 9/1999 | Friedrich | B21C 37/122 219/62 |
| 5,979,551 A * | 11/1999 | Uban | E21B 43/088 166/231 |
| 5,980,745 A * | 11/1999 | Voll | B01D 29/15 166/236 |
| 5,992,518 A * | 11/1999 | Whitlock | B01D 29/15 166/235 |
| 6,382,318 B1 * | 5/2002 | Whitlock | B01D 29/15 166/233 |
| 7,249,631 B2 * | 7/2007 | Rouse | E21B 43/088 166/206 |
| 7,287,684 B2 | 10/2007 | Blackburne et al. | |
| 7,497,257 B2 * | 3/2009 | Hopkins | E21B 43/082 166/227 |
| 7,766,082 B2 * | 8/2010 | Teixeira | E21B 17/22 166/231 |
| 8,127,447 B2 | 3/2012 | Peterson | |
| 8,701,758 B2 * | 4/2014 | Dowsett | E21B 43/084 166/230 |
| 2003/0029614 A1 * | 2/2003 | Michel | E21B 43/04 166/278 |
| 2004/0003927 A1 * | 1/2004 | Rudd | E21B 43/086 166/382 |
| 2004/0004110 A1 * | 1/2004 | Blackburne, Jr. | B01D 29/111 228/130 |
| 2006/0137883 A1 * | 6/2006 | Kluger | E21B 43/084 166/380 |
| 2007/0199889 A1 | 8/2007 | Tueshaus et al. | |
| 2007/0199973 A1 | 8/2007 | Tueshaus et al. | |
| 2010/0122447 A1 | 5/2010 | Peterson | |
| 2015/0238884 A1 * | 8/2015 | Vu | E21B 43/088 210/323.2 |

FOREIGN PATENT DOCUMENTS

| | | | | |
|---|---|---|---|---|
| JP | WO 03091535 A1 * | 11/2003 | | E21B 43/088 |
| WO | 2014088868 A1 | 6/2014 | | |

* cited by examiner

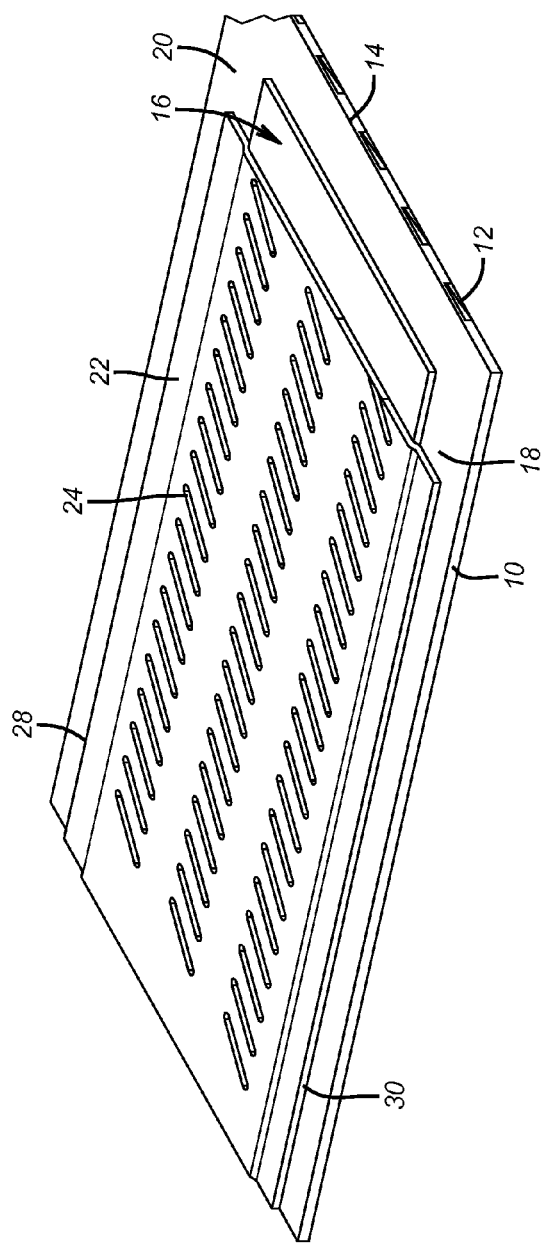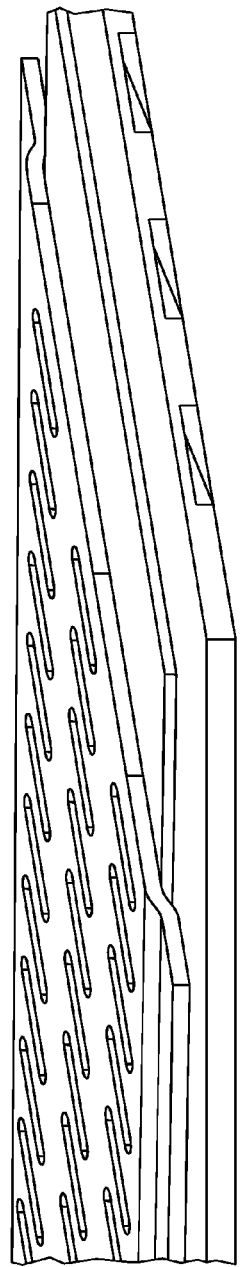

SUBTERRANEAN SCREEN ASSEMBLY MANUFACTURING METHOD

FIELD OF THE INVENTION

The field of the invention is a manufacturing method for a multi-layer shrouded screen.

BACKGROUND OF THE INVENTION

Screen assemblies that are used in boreholes typically involve a perforated base pipe that has opposing connections for joining to a tubular string. The connections are likely threaded. The filtering media can be in different formats such as a continuous wire having a predetermined cross-section wound around circumferentially spaced and axially oriented members and spot welded to the axial members at intersections with the wound wire. Various weaves of wire are also known and used in such applications. These screen material feature a grid pattern of interwoven metal wires one example of which is a Dutch twill. To protect the one or more filtering layers that are mounted over the base pipe there is an outer shroud that is used. The shroud protects the filtering layers from damage on the way into the hole and features an ordered pattern of holes or rows of louver type openings made by punching through the material that comes in strip or sheet form. Such sheets or strips have been reformed into cylindrical shapes by being spiral wound and having the spiral seams welded. Welding spirally wound material after forming it into a cylinder shape whether using a single or multiple parallel wound strips is shown in US2007/0199973 and US 2007/1199889. Overlying layers and spirally winding them together followed by seam welding the outer layer is shown in U.S. Pat. No. 7,287,684 FIG. 6. Making layers of nested cylindrical shapes for the screen assembly and outer shroud and then assembling them to each other and inserting a mandrel and running the assembled components through a die to get a desired exterior dimension is shown in U.S. Pat. No. 8,127,447. The problem with the latter design is that it was difficult to get a desired finished exterior dimension on the assembly and controlling that dimension was important because the assembly has to pass through drift dimensions downhole without binding. Another issue with the pulling the assembly through a die was that the layers were pushed tightly together and against the base pipe. Frequently one or more drainage layers had to be omitted to insure that the desired exterior dimension could be obtained.

What was needed and is provided by the present invention is a method to assemble a screen assembly by taking the layers when they are laid flat as strips and joining an outer to an inner layer with a screening layer trapped in between followed by spiral rolling the assembly and seam welding or otherwise closing a spiral seam on the exterior. These and other aspects of the present invention will become more readily apparent to those skilled in the art from a review of the description of the preferred embodiment and the associated drawings with the understanding that the full scope of the invention is to be determined by the appended claims.

SUMMARY OF THE INVENTION

A filtering assembly is laid flat on an outer shroud strip. An inner drainage layer is set over the filtering assembly while laid flat such that the inner drainage layer overlaps the filtering assembly. The inner drainage layer is secured and sealed to the outer shroud strip by welding or diffusion bonding while overlaying the filtering assembly. With the filtering assembly held firm between the inner drainage layer and the outer shroud a spiral winding procedure is commenced to roll the flat assembly into a cylindrical shape. The edges are secured by welding. The spiral winding and seam closure can be done on a perforated base pipe or the base pipe can be inserted into the finished assembly at a later time and secured. Alternatively the filtering assembly and outer shroud, with or without the drainage layer can be wound over a perforated base pipe or a complete screen assembly.

BRIEF DESCRIPTION OF THE DRAWINGS

FIG. 1 is a view of a three layer arrangement laid flat showing the top attached to the bottom layer over the middle layer;

FIG. 2 is a close up view of FIG. 1;

DETAILED DESCRIPTION OF THE PREFERRED EMBODIMENT

Figure 3:
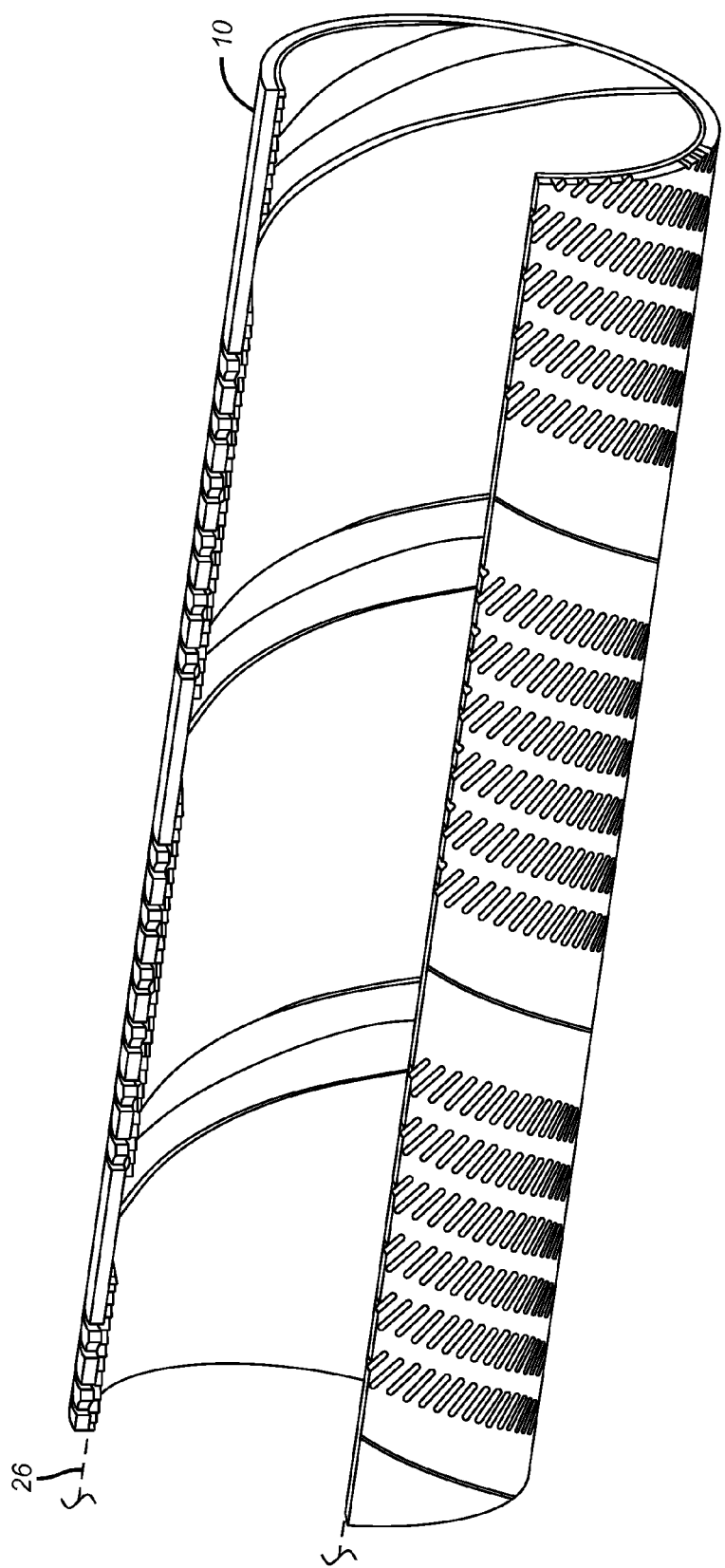
FIG. 3 shows the three layers of FIG. 1 spirally wound and in a cylindrical shape with the seam closed.

An outermost layer 10 has openings 12 that can have any shape or that appear in parallel rows or a random arrangement and are formed with a punching through the wall of layer 10 or by other means. The openings 12 are visible at the edge 14 and are disposed parallel to each other in adjacent rows. The width of this layer exceeds the width of the above layer or layers 16 that collectively are the screen assembly. This leaves opposed end areas 18 and 20. On top of layer or layers 16 can be a top layer 22 which will become an inner drainage layer when the cylindrical shape is obtained as shown in FIG. 3. The layer 22 has openings 24 that can have any shape or that appear in parallel rows or a random arrangement and are formed with a punching through the wall of layer 22 or by other means. The pattern of openings 24 on layer 22 is similar to the opening pattern on outermost layer 10. Preferably openings 12 are offset from openings 24 so that fluid moving radially through the finished assembly as shown in FIG. 3 has a path with several turns to get to the openings in the base pipe 26 shown schematically in FIG. 3. Preferably, layer 22 fully overlaps layer or layers 16 and has opposed edges 28 and 30 disposed in opposed end areas 18 and 20 where joining of layers 10 and 22 takes place. Joining can be by welding or diffusion bonding. In between the layer or layers 16 are fixated although some relative movement can be tolerated in the flat state depicted in FIGS. 1 and 2. The assembly thus joined together is spirally wrapped into a tubular shape as shown in FIG. 3. This can be done over the perforated base pipe 26 or over another type of mandrel such as a commercially available wire wrap screen such as the Bakerweld® gravel pack screen sold by Baker Hughes Incorporated. In this instance the assembly of FIGS. 1-3 is assembled over a functional screen segment which can allow elimination of the layer 22 because the functioning mandrel 26 is itself a screen. In this event the layer or layers 16 can be secured directly to the outer layer 10. The overall outside diameter of such an assembly can be reduced with the elimination of layer 22 and its replacement with a functional screen acting as a mandrel for an overlying screen. The seam or seams are closed on layer 10 that is now on the exterior. Various techniques can also be used to secure the now tubularly shaped assembly shown in FIG. 3 to the base pipe or other mandrel 26. Alternatively the assembly in FIG. 1 can be rolled over a dummy mandrel into the FIG. 3 shape for seam sealing and the mandrel can then be inserted into the tubular shaped and the two components then joined together. The rolling into a cylinder shape by spiral winding can be by the technique used in U.S. Pat. No. 7,287,684 or another known technique.

The above description is illustrative of the preferred embodiment and many modifications may be made by those skilled in the art without departing from the invention whose scope is to be determined from the literal and equivalent scope of the claims below.

We claim:

1. A manufacturing method for a subterranean tubular screen assembly having a longitudinal axis, comprising:
    attaching at least three flat layers, wherein a first of said layers is wider than an adjacent second of said layers leaving spaced exposed ledge surfaces on said first layer on opposed ends of said second layer, said second layer is disposed between said first and a third said layer, said second layer acting as a screen and said first and third layers have offset openings such that flow passing said first layer has to flow axially in a direction generally parallel to the longitudinal axis through said screen to reach an offset third layer opening;
    spiral winding said attached layers into a tubular shape;
    sealing a spiral seam formed by said spiral winding.

2. The method of claim 1, comprising:
    performing said spiral winding over a perforated base pipe.

3. The method of claim 1, comprising:
    performing said spiral winding over another finished screen assembly.

4. The method of claim 1, comprising:
    attaching said at least three flat layers in a flat state;
    securing said third layer to said first layer at a location beyond opposed edges of said second layer.

5. The method of claim 4, comprising:
    securing said third and first layer with welding or diffusion bonding.

6. The method of claim 5, comprising:
    fixating said second layer in a flat state between said third and first layers with said welding or diffusion bonding of said third to said first layers.

7. The method of claim 6, comprising:
    providing a plurality of rows of openings in said third and first layers.

8. The method of claim 1, comprising:
    securing said spiral seam with welding.

9. The method of claim 1, comprising:
    using one of said at least three flat layers as a shroud with rows of openings;
    disposing said shroud over another of said at least three flat layers as a result of said spirally winding where said another layer acts as a screen assembly protected by said shroud.

10. The method of claim 9, comprising:
    spirally winding said shroud and screen assembly over another screen that acts as a mandrel for said shroud and screen assembly.

11. The method of claim 9, comprising:
    spirally winding said shroud and screen assembly over a perforated base pipe that acts as a mandrel for said shroud and screen assembly.

12. The method of claim 4, comprising:
    using said second layer as a screen assembly and said first layer as a protective shroud for said screen assembly with said third layer as a drainage layer for said screen assembly.

13. The method of claim 12, comprising:
    spirally winding said layers over a perforated base pipe.

14. The method of claim 12, comprising:
    spirally winding said layers over another screen assembly to act as the base pipe.

15. The method of claim 7, comprising:
    shaping said openings as punched slots.

16. The method of claim 1, comprising:
    securing said at least three flat layers with welding or diffusion bonding.

17. The method of claim 3, comprising:
    said another finished screen assembly comprises a wire wrap screen.

18. The method of claim 10, comprising:
    said another screen comprises a wire wrap screen.

* * * * *